G. P. SEGRAVES.
SWITCH MECHANISM FOR RAILWAYS.
APPLICATION FILED MAR. 2, 1910.
970,653.
Patented Sept. 20, 1910.
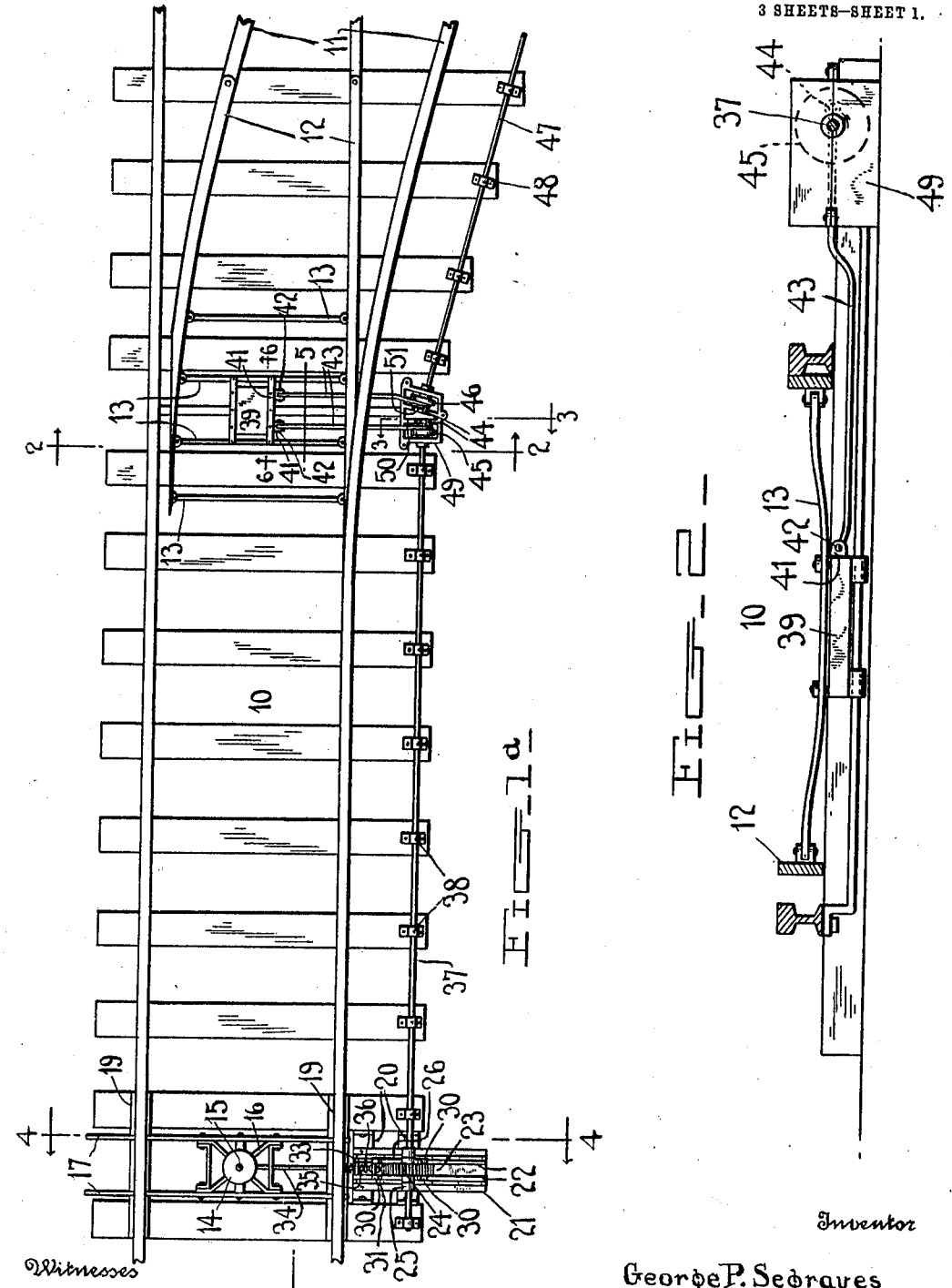
Inventor
George P. Segraves

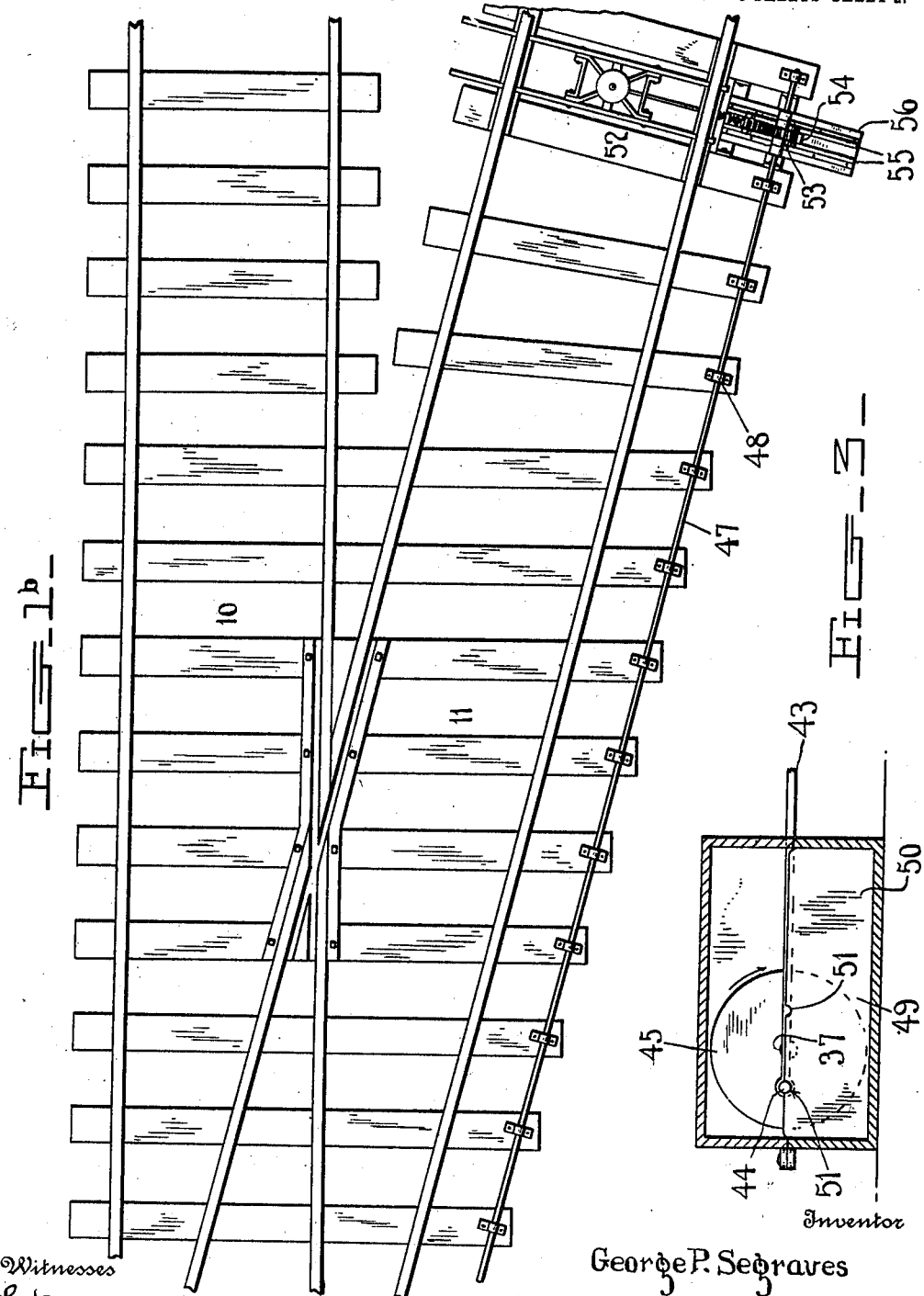

G. P. SEGRAVES.
SWITCH MECHANISM FOR RAILWAYS.
APPLICATION FILED MAR. 2, 1910.
970,653.
Patented Sept. 20, 1910.
3 SHEETS—SHEET 3.
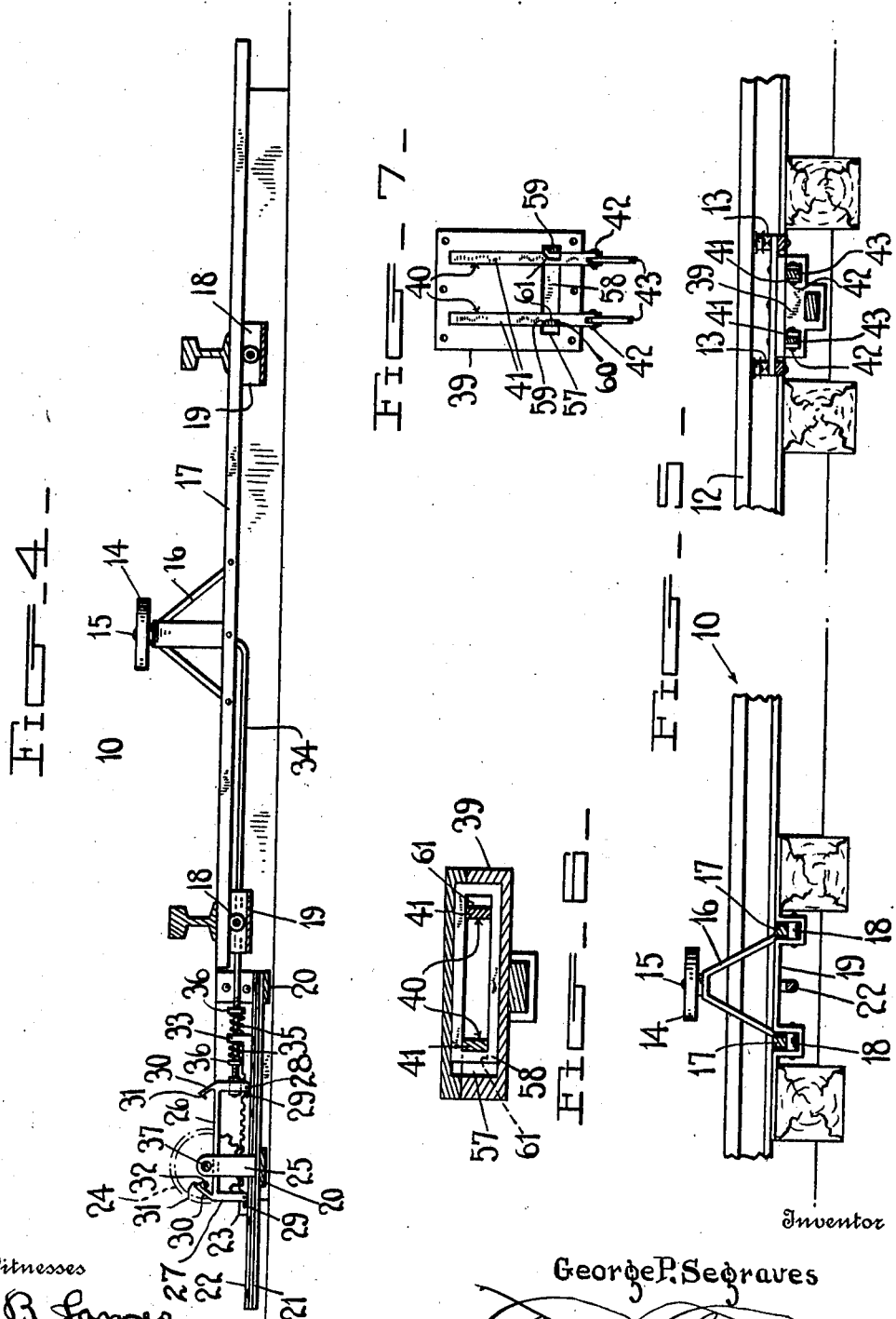

UNITED STATES PATENT OFFICE.

GEORGE P. SEGRAVES, OF PERRY, KANSAS.

SWITCH MECHANISM FOR RAILWAYS.

970,653.  Specification of Letters Patent.  Patented Sept. 20, 1910.

Application filed March 2, 1910. Serial No. 546,866.

*To all whom it may concern:*

Be it known that I, GEORGE P. SEGRAVES, a citizen of the United States, residing at Perry, in the county of Jefferson, State of Kansas, have invented certain new and useful Improvements in Switch Mechanism for Railways; and I do hereby declare the following to be a full, clear, and exact description of the invention, such as will enable others skilled in the art to which it appertains to make and use the same.

The invention relates to switch mechanism and more particularly to the class of automatic switch operating mechanisms for railways.

The primary object of the invention is the provision of switch operating mechanism in which the switch points may be thrown to opened or closed position by a passing train so that the latter may enter a branch or side track or continue its travel along the main line or track.

Another object of the invention is the provision of switch operating mechanism for railways in which a switch may be automatically set by actuating mechanism upon a locomotive or car, which mechanism is under the control of the operator and so arranged that the switch may be moved to opened or closed position for the main or branch line respectively, thereby enabling a train to continue its travel over the main line or to enter the branch line intersecting said main line.

A further object of the invention is the provision of a switch operating mechanism which is exceedingly simple in construction, efficient and positive in action or operation, and inexpensive in the construction.

In the drawings accompanying and forming part of this specification is illustrated the preferred form of embodiment of the invention, which to enable those skilled in the art to carry the invention into practice will be set forth at length in the following description while the novelty of the invention will be pointed out in the claims succeeding the description.

In the drawings:—Figure 1ª is a fragmentary top plan view of a railway track and switch with a portion of the invention applied thereto. Fig. 1ᵇ is a top plan view of another portion of the railway track with the remaining portion of the invention applied thereto. Fig. 2 is a transverse sectional view on the line 2—2 of Fig. 1ª. Fig. 3 is a vertical sectional view on the line 3—3 of Fig. 1ª. Fig. 4 is a transverse sectional view on the line 4—4 of Fig. 1ª. Fig. 5 is a transverse sectional view on the line 5—5 of Fig. 1ª. Fig. 6 is a fragmentary transverse sectional view on the line 6—6 of Fig. 1ª. Fig. 7 is a top plan view of the shiftable boxing with its cover removed.

Similar reference characters indicate corresponding parts throughout the several views in the drawings.

Referring to the drawings by numerals 10 designates the main line track and 11 the branch or side line track. The rails of the side line track 11 join the rails of the main line track 10 in the usual manner by movable switch points 12 which may be of any approved or ordinary well known type, and these points 12 are connected by spaced tie rods 13 extending transversely from one point to the other whereby the said points will be caused to move in unison in a manner as will be subsequently more fully described.

At a suitable distance from the switch points 12 and located between the rails of the main track 10 is a friction roller 14 the latter being centrally journaled upon a stud axle or spindle 15 rising vertically from upwardly converging brackets or irons 16 rigidly fixed to spaced slidable guide rods 17 disposed transversely of the main track 10 beneath the rails thereof, and these rods 17 are supported upon anti-friction rollers 18 disposed and suitably journaled beneath the rails of the main line track. The said guide rods 17 being united by tie plates 19 to prevent spreading of the guide rods or displacement of one with respect to the other laterally of the track.

At one side of the main track 10 and connected to adjacent cross ties supporting the rails of the main track are brackets 20 supporting a base or platform 21 upon which are fixed spaced parallel guides 22 forming tracks slidably engaged by a slidable toothed rack bar 23, the latter meshing with a cog gear 24, the same being disposed between vertical bearings 25, and this rack bar 23 carries a frame 26, the same provided with depending legs 27 united in pairs by cross pins 28, the latter being loosely engaged in elongated slots 29 formed in the rack bar. At opposite ends of the frame 26 are stationary catches 30 having hook bills 31, which latter are adapted to alternately engage laterally projecting pins 32 integral with the cog gear 24 and protruding from opposite sides thereof so as to lock the said gear from accidental rotation.

On the innermost end of the rack bar 23 is formed an eye 33 through which is loosely passed one end of a rod 34, the latter being also connected to the slidable guide rods 17 immediately below the anti-friction roller 14 between the rails of the main track. Disposed at opposite sides of the eye 33 and surrounding the rod 34 are coiled springs 35 each having one end bearing against the eye 33 and its opposite end bearing against an abutment nut 36. The said rod 34 at its outermost end has connection with the frame 26 so that upon movement of this rod the frame 26 will be first moved so as to disengage the hook bills 31 of the catches 30 from the pins 32 prior to the movement of the rack bar 23 for actuating the cog gear 24, and in this manner the latter will be free to rotate.

At one side of the main track 10 and arranged in parallelism therewith is a rotatable shaft 37, the latter being suitably journaled in bearings 38, and to one end of this shaft 37 is fixed the cog gear 24 for the purpose as will be hereinafter more fully described.

Arranged between the tie rods 13 connecting the switch points 12 is a block 39 forming a housing in which is provided spaced parallel guide channels 40 in which are suitably mounted bars 41, the outer ends of which are pivoted as at 42 to pitmen 43, the latter being eccentrically connected as at 44 to rotatable disks 45 and 46, the former of which is fixed to the remaining end of the rotatable shaft 37 while the latter disk 46 is fixed to a rotatable shaft 47 disposed in suitable bearings 48 at one side of the branch track or line 11. These disks are surrounded by a boxing 49, the vertical walls of which terminate in a plane with the axes of rotation of the said disks 45 and 46, and this boxing 49 is provided with partitions 50, the same being of a corresponding height to the vertical walls of the boxing, and in their upper edges are provided notches 51, the same being arranged in the arc of movement of the pins 44 eccentrically connecting the pitmen 43 to the said disks and which pins 44 are adapted to enter the notches upon one-half revolution of the disk so that the latter are limited in their rotation when being actuated by the switch operating mechanism.

The shaft 47 is provided at its remaining end with a cog gear 53 meshing with a rack bar 54 mounted in guides 55 fixed to a platform 56 suitably supported at one side of the side or branch line, the latter being operated in a like manner by corresponding switch operating mechanism designated generally at 52 as that disposed between the rails of the main track 10. The switch operating mechanism operating the rack bar at one side of the branch or side line is disposed between the rails of the branch or side line at a considerable distance removed from the switch points.

Within the boxing 49 and intersecting the channels 40 is an annular race-way 57 in which is disposed a ring 58, the latter encircling the bars 41, and one face of this ring is beveled as at 59 while its opposite face presents a flat surface 60, and this ring 58 is adapted to be automatically shifted to alternately engage in notches or recesses 61 formed in the bars 41 at their outer edges, the said recesses or notches 61 being correspondingly shaped to the ring in cross section so that upon movement of one of the bars 41 this ring 59 is displaced to engage in the notch 61 in the other bar 41 thereby locking the bar in the boxing 49, whereby the switch points may be thrown.

In connection with the above described switch mechanism it is, of course, to be understood that there is to be employed a trip mechanism adapted to be located upon a locomotive or cars, the said trip mechanism being adapted to engage the friction rollers between the rails of the main and side tracks respectively to move the said roller laterally of the tracks in either direction as to actuate the switch points to bring the same into opened or closed position.

In operation, presuming that the engineer wishes to switch his train from the main track into the side line or track to enable a succeeding train to pass the switch on the main line, he operates a trip mechanism upon the locomotive or one forward car in a manner so as to set the mechanism whereby it will actuate the anti-friction roller 14 in a direction between the rails of the main track 10, so as to move the rack bar 23, which will rotate the cog gear 24, thus turning the shaft 37, and through the medium of the pitman 43, connected to the disk 45, the block 39, will be caused to shift laterally thereby effecting the movement of the switch points 12 so as to open the switch. In the opening of the switch it will be noted that the bar 41, having connection through the medium of the pitman 43 with the disk 46, will slide in its channel 40, within the block 39, while the latter is being moved so that the shaft 47, carrying the disk remains passive which prevents shifting of the switch operating mechanism 52, in the side line or track. As the train enters the side or branch track 11, the trip mechanism on the locomotive of the said train actuates the switch operating mechanism 52, in the branch or side track, so as to rotate the shaft 47, in a direction to move the bar 41, which is connected through the medium of the pitman 43 with the disk 46, so that the said bar will move within the block 39, to have the notch 61, register with the annular recess 57, in said block 39, and after this has been done the trip mechanism on the rearmost car or caboose actuates the antifriction roller 14, in a direction between the rails of the main track so that the shaft 37, is reversely moved whereby the bar 41, connected through the medium of the pitman 43, with the disk 45, will slide in the said block 39, to act upon the ring 58, to bring it into locked engagement with the bar 41, connected through the medium of the pitman 43, with the disk 46, which latter is controlled by the switch operating mechanism in the side line or branch track. Now the train having fully entered the side line or branch track 11, and proceeded therein a distance so that the trip mechanism on the caboose or rearmost car of the train will actuate the switch operating mechanism 52, in the branch line or track so as to reversely rotate the shaft 47, and by the bar 41, which is connected with the disk 46, on said shaft being locked in the block 39, the latter will be moved in a direction to effect the closing of the switch thereby enabling the succeeding train to pass the switch and continue along the main line or track.

What is claimed is:—

1. The combination with a main line and a branch, of a switch adapted to join the branch to the main line, laterally shiftable mechanism arranged in the main line, laterally shiftable mechanism arranged in the branch line, connections between said mechanism and the switch, and means for alternately locking the said connections with the switch.

2. The combination of a main track and a branch track, of a switch adapted to join the branch with the main line, laterally shiftable means arranged in the main line and in the branch line, rotatable shafts disposed along the main and branch lines and controlled by said laterally shiftable means, a channeled block connected to the switch, slidable bars mounted within the channeled block and having connection with the rotatable shafts, and means within the block for alternately locking the said slidable bars against sliding movement in said block.

3. The combination with a main track, a branch track and movable switch points connecting the same, of guide rods slidable transversely of the main track at a distance removed from the switch points, a rotatable shaft journaled at one side of the main track, a cog gear fixed to said shaft, a rack operating said cog gear, a connection between the rack and the said slidable rod, a friction roller located centrally of the main track and having superposed connection with the slidable rod, and means operative by the shaft and connected with the switch points to move the latter upon engagement of the friction roller by trip mechanism carried by a moving train on the main track.

4. The combination with a main track, a branch track and movable switch points connecting the same, of guide rods slidable transversely of the main track at a distance removed from the switch points, a rotatable shaft journaled at one side of the main track, a cog gear fixed to said shaft, a rack operating said cog gear, a connection between the rack and the said slidable rod, a friction roller located centrally of the main track and having superposed connection with the slidable rod, tie rods connecting the switch points, a guide block fixed to said tie rods, a stationary guide bar below the plane of the switch points and engaged by the guide blocks, a disk fixed to the shaft, and a pitman eccentrically connected to the disk and to the guide block.

In testimony whereof, I affix my signature, in presence of two witnesses.

GEORGE P. SEGRAVES.

Witnesses:
PAT SEGRAVES,
J. W. COLLEY.